2,948,654
Patented Aug. 9, 1960

2,948,654

INSECTICIDAL COMPOSITION COMPRISING SESOXANE AND METHOXYCHLOR

Homer E. Fairchild, Wilmington, Del., assignor to E. I. du Pont de Nemours and Company, Wilmington, Del., a corporation of Delaware No Drawing. Filed Sept. 24, 1957, Ser. No. 685,813

4 Claims. (Cl. 167—30)

This invention is directed to highly effective insecticidal compositions and methods employing methoxychlor and "Sesoxane."

More particularly, this invention relates to the use of "Sesoxane" as a general synergist for methoxychlor. Mixtures of these two compounds ordinarily have at least a 200% increase in insecticidal activity over methoxychlor alone. In some instances, the combination shows a 1700% increase in activity over methoxychlor alone. Because mammalian toxicity is very low, the combination is safely used about the household, on dairy cattle, on stored grain, and the like.

This remarkable increase in insecticidal activity is completely unexpected. While the art knows that "Sesoxane" synergizes with pyrethrins (see for example, Chemical and Engineering News for December 17, 1956, at page 6236), it has heretofore not been known that "Sesoxane" would synergize with any other insecticide. In fact reports in the literature indicate that "Sesoxane" would not be expected to synergize with other insecticides, such as 2, 2-bis (p-chlorophenyl)-1,1,1-trichloroethane. (See, for example, R. L. Metcalf's book, "Organic Insecticides," page 76, published in 1955 by Interscience Publishers, Inc.)

Methoxychlor is the common name for 2,2-bis (p-methoxyphenyl)-1,1,1-trichloroethane, a commercially available insecticide which has the structural formula:

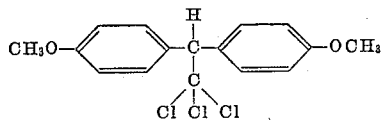

"Sesoxane" is a trademark for 2-(3,4-methylenedioxyphenoxy)-3,6,9-trioxaundecane or acetaldehyde 2-(2-ethoxy-ethoxy) ethyl 3,4-methylenedioxy phenyl acetal, and has the structural formula:

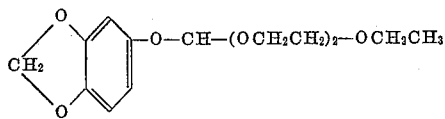

A method for preparing "Sesoxane" is described by M. Beroza in the Journal of Agricultural and Food Chemistry, vol. 4, pages 49–53 (1956).

The terms "insecticide" and "insect" are used herein in their broad common usage and include spiders, mites, nematodes, and the like pests which are not in the strict biological sense classed as insects. Thus, the usage herein conforms to the definitions provided by Congress in Public Law 104, the "Federal Insecticide, Fungicide, and Rodenticide Act" of 1947, section 2, subsection h, wherein the term "insect" is used to refer not only to those small invertebrate animals belonging mostly to the class Insecta, comprising six-legged, usually-winged forms, as beetles, bugs, bees, flies, and so forth, but also to other allied classes of anthropods whose members are wingless and usually have more than six legs, as spiders, mites, ticks, centipedes, wood lice, and the like.

What I mean when I say "Sesoxane" is a general synergist for methoxychlor is that methoxychlor-"Sesoxane" combinations exhibit higher toxicity to insects than either component used alone. This synergistic effect is not peculiar to one, two or a few insects but is generally observed throughout the world of insect life.

In operating in accordance with the present invention, any suitable amount of "Sesoxane" can be employed in combination with methoxychlor to obtain compositions in which methoxychlor is activated by "Sesoxane" because no particular proportion of "Sesoxane" need be admixed with methoxychlor in order to obtain such synergism. The optimum proportions of the active components will vary depending upon the particular insect species to be controlled, the physiological age of the insects, the prevailing climatic conditions, the formulation used, etc. It is impossible, therefore, to state exactly the best proportions to be used in every situation.

While the exact amounts of each component in a given mixture do not appear to be critical, it is preferred to use compositions containing the two compounds admixed together in a ratio of from about 1:2 to 25:1 parts by weight of methoxychlor to "Sesoxane." Still more preferred compositions are those containing the compounds in 1:1 ratio on a weight basis.

The insecticidal mixtures of the invention can be employed by mixing them with conventional pest control adjuvants, modifiers, diluents or conditioning agents, hereinafter called generically inert carriers, to provide compositions in the form of solutions, emulsions, dispersions, powders dispersible in water or other solvent, dusts or the like. Thus, they can be employed with a carrier or diluent agent such as a finely divided solid, a solvent liquid of organic origin, water, a surface active agent, or aqueous emulsion or any suitable combination of one or more of any of these. Such formulations or compositions facilitate handling and application and frequently enhance insecticidal effectiveness.

One advantage accruing from formulation is that synergistic mixtures of methoxychlor and "Sesoxane" can be made to have a much longer lasting residual insecticidal effect than would otherwise be the case. For example, a spray containing 2.5% methoxychlor with "Sesoxane" admixed in a ratio of from about 10:1 to 5:1 methoxychlor to "Sesoxane" ordinarily gives protection for five weeks or more against flies in barns. Yet, a spray containing only 2.5% methoxychlor as active insecticide ordinarily gives only about three weeks protection against flies in barns.

Another advantage of methoxychlor-"Sesoxane" formulations is the increased knockdown. By knockdown I mean that percentage of insects out of the total number treated with a given insecticide formulation which are immobilized and not capable of walking or flying at a measured time interval after such treatment. For example, a spray containing 2.5% methoxychlor with "Sesoxane" admixed in a ratio of from about 1:1 to 10:1 ordinarily gives an increase of from 150 to 250% or more in knockdown over that knockdown ordinarily obtained from a spray containing 2.5% methoxychlor alone.

The liquid compositions, whether solutions or dispersions of the active agents in a liquid solvent, and also the wettable powder compositions of the invention, may contain as a conditioning agent one or more surface active agents in amounts sufficient to render the composition readily dispersible in water. By the term surface active agent are included wetting agents, dispersing agents, emulsifying agents and the like.

Suitable surface active agents are set out, for example, in Searle U.S. Patent No. 2,426,417, Todd U.S. Patent No.

2,655,447, or Jones U.S. Patent No. 2,412,510. Particularly good agents are set forth in Linher et al. U.S. Patent No. 2,139,276. A detailed list of such agents is set forth in an article in "Soap and Chemical Specialties," vol. 31, No. 7, pages 50–61; No. 8, pages 48–61; No. 9, pages 52–67 and No. 10, pages 38–67 (1955). See also McCutcheon in "Chemical Industries," November 1947, page 8011, entitled "Synthetic Detergents"; and Bulletin E–607 of the Bureau of Entomology and Plant Quarantine of the U.S. Department of Agriculture. In general less than 10% by weight of surface-active agent is present in the compositions containing methoxychlor and "Sesoxane" and usually less than 1% by weight is present.

Particularly useful formulations are those prepared for use as sprays and aerosols including low pressure sprays containing propellants. Typical propellants are trichloromonofluoro methane (a substance sold under the Du Pont trademark "Freon 11") and dichloro-difluoro methane (a substance sold under the Du Pont trademark "Freon 12"). A popular inert carrier for such sprays and aerosols is an odorless petroleum distillate which may perhaps be used to the extent of from about 40 to 95% by weight in such formulations.

Compositions intended for use as sprays and aerosols can contain from 0.5 to 5% by weight methoxychlor using ratios of methoxychlor to "Sesoxane" of 1:2 to 10:1.

Powdered or dust compositions of the invention whether or not also modified with a surface-active dispersing agent, are prepared by admixing the active agents with finely divided solids, preferably talcs, natural clay, pyrophyllite, diatomaceous earth and flours such as walnut shell, wheat, redwood, soya bean and cotton seed flours. Other inert solid carriers which can be used include magnesium and calcium carbonates, calcium phosphates, sulfur, lime, etc., either in powder or granular form.

The percentage by weight of the active agents will vary according to the manner in which the dust composition is to be applied but, in general, will be from about 0.5 to 95% by weight of the insecticidal composition. Preferred dusts will contain from 1 to 10% by weight methoxychlor with ratios of methoxychlor to "Sesoxane" of from 1:2 to 10:1 by weight.

The compositions of the invention can optionally include fungicides such as ferric or zinc dimethyldithio carbamate, zinc ethylenebis(dithiocarbamate), manganese ethylenebis(dithiocarbamate) and N-trichloromethyl thio-4-cyclohexene-1,2-dicarboximide. Also, the compositions can optionally include other insecticides, such as chlordane-mercaptosuccinic acid, diethyl ester, S-ester with thionophosphoric acid, dimethyl ester, and the like. See, for example, U.S. Patent 2,426,417 for other additives.

The rate of application of compositions containing mixtures of methoxychlor and "Sesoxane" will vary with the particular insect pest involved, the formulation used, the mode of application, prevailing atmospheric conditions, and the like. So many variables enter into the subject that it is not possible to state generally a rate suitable for each application situation. However, in general, application rates of from about 0.1 to 10 pounds per treated acre are generally effective for mixtures of methoxychlor with "Sesoxane." The formulations used will generally contain from 0.5 to 75% methoxychlor. More preferred compositions will contain from 0.5 to 25% methoxychlor.

Particular use rates that are generally found effective are given in the following table but it must be understood that the determination of the proper rate in any given instance is conventional procedure to those skilled in the art:

| Crop, Host or Area | Insect | Dosage, Active Methoxychlor | Ratio of Methoxychlor-"Sesoxane" | Method Application |
|---|---|---|---|---|
| Alfalfa | Alfalfa caterpillar | .5 to 1.5 lb./A | 1:2 to 25:1 | Spray. |
|  | Meadow spittlebug | .5 to 1.0 lb./A | do | Do. |
| Clover | Clover seed weevil | 2 to 5% | do | Dust at 20 lb./A. |
| Corn | European corn borer | .5 to 1.5 lb./A | do | Spray. |
|  |  | 2 to 5% | do | Dust at 40 lb./A. |
| Beans | Aphids | 3 to 6 lb./A | To 25:1 | Spray. |
| Cabbage | Flea beetles | .5 to 1.25 lb./A | do | Do. |
| Apple | Apple maggot | .5 to 2 lb./100 gal. water | do | Do. |
| Rose | Aphids | 1 to 5% | 1:2 to 10:1 | Aerosol. |
| Cattle | Horn fly | .5% | do | Spray. |
| Barns | House fly and stable fly | 1 to 5% | 1:2 to 25:1 | Residual spray. |
| House | Cockroaches | do | 1:2 to 10:1 | Spray or paint. |
| Barn | House fly | .5 to 2% | do | In baits. |

The above applications generally always result in a 100% kill of the insect treated. Results of contact tests against the German cockroach were very spectacular. Increase in kill for the combination of methoxychlor-"Sesoxane" as much as 1700% over methoxychlor alone was observed.

In order that the invention may be better understood, the following examples are given in addition to the examples already given above. The examples illustrate typical insecticidal compositions of the invention, methods for their preparation, insecticidal applications and the results obtained. The numbers following the tabulated ingredients represent parts by weight of the ingredients in the respective compositions.

EXAMPLE 1

*Water-dispersible powders*

The following powdered compositions are adopted for dispersing in water for application as a spray for the destruction and prevention of insects. The powdered compositions are made by intimately mixing the listed ingredients using conventional mixing or blending equipment and then grinding the mixture to give a powder having an average particle size less than about 50 microns.

A.

| | |
|---|---|
| Methoxychlor | 50.0 |
| "Sesoxane" | 10.0 |
| Synthetic fine silica | 30.0 |
| Alkyl aryl sodium sulfonate | 1.5 |
| Methyl cellulose 15 cp. | .25 |
| Attapulgite | 8.25 |

This formulation can be used to control lice on cattle when applied at the rate of 8 pounds of the above suitable powder composition per 100 gallons of water in a power sprayer operating at 200 pounds per square inch pressure. Preferably the cattle are sprayed for complete coverage to the point of run-off (which is usually about 1 gallon per animal) with the prepared spray solutions for substantially complete control of lice.

B.

| | |
|---|---|
| Methoxychlor | 50.0 |
| "Sesoxane" | 5.0 |
| Synthetic fine silica | 10.0 |
| Attapulgite | 34.15 |
| Dioctyl sodium sulfosuccinate | 0.3 |
| Ditertiary acetylenic glycol M.P. 37° C. | 0.3 |
| Sodium lignin sulfonate | 0.25 |

This formulation can be used for the control of Mexican Bean Beetles when applied at the rate of 2 pounds of the above composition per 100 gallons of water. When applied as a spray to infested garden plants with thorough coverage, substantially complete Mexican bean beetle control is obtained.

EXAMPLE 2

Dust

The following composition is adopted as a direct application as dusts for the destruction or prevention of insects using conventional dusting equipment. The dusts are made by first micropulverizing methoxychlor with a minor diluent and then blending the resulting composition with a major diluent. The resulting composition should have a particle size of about 50 microns. "Sesoxane" is sprayed on during the last blending step.

| | |
|---|---|
| Methoxychlor | 10.0 |
| "Sesoxane" | 0.5 |
| Attapulgite | 10.0 |
| Micaceous talc | 79.5 |

This formulation can be used for the substantially complete control of fleas on pets. Just enough powder should be used to give thorough coverage of the necessary body areas. Residual protection for two or more weeks is ordinarily obtained.

EXAMPLE 3

Emulsifiable concentrate

The following compositions are in liquid form and are adopted for addition to water to give aqueous dispersions for application as sprays. The fluid compositions shown are prepared by thoroughly mixing the active compounds and other agents in an organic liquid diluent.

| | |
|---|---|
| Methoxychlor | 25 |
| "Sesoxane" | 5 |
| Alkylated naphthalene (principally α-methyl naphthalene) | 65 |
| Alkyl aryl polyether alcohol | 5 |

This formulation can be used for the control of plum curculio by preparing an aqueous spray solution with the above emulsifiable concentrate which contains one pound of methoxychlor per 100 gallons of water. Substantially complete control of the plum curculio is obtained.

EXAMPLE 4

Bait composition

In this formulation, pulverized methoxychlor is ribbon-blended with the other components until the mix is homogeneous. Particle sizes below about 50 microns are preferred.

| | |
|---|---|
| Methoxychlor | 2 |
| "Sesoxane" | 2 |
| Granulated sugar | 10 |
| Sand | 86 |

This composition is adopted for shaker application and is very useful for house fly control in dairy barns. The product is conveniently scattered on the floors and crevices of dairy barns.

EXAMPLE 5

Spray formulations

The following composition is adopted for household spray application. The components are mixed and then blended with a deodorized kerosene, alkylated napthalene mixture.

This formulation can be used not only as a spray but also as a paint around baseboards, thresholds and the like. It is generally extremely effective against household insect pests.

| | |
|---|---|
| Methoxychlor | 4 |
| "Sesoxane" | 0.5 |
| Pyrethrum | 0.1 |
| Deodorized kerosene | 79.4 |
| Alkylated naphthalene | 16.0 |

EXAMPLE 6

Aerosols (A) To prepare a 12 ounce (340 gram) "bomb," 47.6 grams of a concentrate consisting of 34.0 grams of methylene chloride, in which is dissolved 10.2 grams methoxychlor and 3.4 grams "Sesoxane," is metered into the 12 ounce "bomb" container. The container and contents are then cooled to from −15 to −20° F. Then 292.4 grams of mixed "Freons" (Du Pont trademark) composed of 50% "Freon 12" and 50% "Freon 11" is metered into the "bomb" can. The can is sealed, equipped with a suitable valve, and allowed to come to room temperature. The "bomb" is ready for use and has the following composition:

| | |
|---|---|
| Methoxychlor | 3.0 |
| "Sesoxane" | 1.0 |
| Methylene chloride | 10.0 |
| "Freon 12" | 43.0 |
| "Freon 11" | 43.0 |

This composition can be used for the substantially complete control of flying insects in a room. The entire room is carefully misted and the flies, mosquitoes, and other flying insects which are present in the room are knocked down and killed.

(B) To prepare a 12 ounce (340 grams) "bomb," 176.8 grams of concentrate consisting of 153.0 grams of deodorized kerosene and 17 grams acetone, in which are dissolved 3.40 grams methoxychlor, 1.70 grams "Sesoxane" and 1.70 grams 20% pyrethrum conc. are placed in the "bomb" container. Container and contents are then cooled to from −15 to −20° F. Then 163.2 grams of mixed "Freons" composed of 50% "Freon 12" and 50% "Freon 11" is metered into the "bomb" can. The can is sealed, equipped with a suitable valve and allowed to come to room temperature. The "bomb" is ready for use and has the following composition:

| | |
|---|---|
| Acetone | 5.0 |
| Methoxychlor | 1.0 |
| "Sesoxane" | 0.5 |
| 20% pyrethrum conc. | 0.5 |
| Deodorized kerosene | 45.0 |
| "Freon 12" | 24.2 |
| "Freon 11" | 24.2 |

This spray can be used for the substantially complete control of silver fish by making a thorough application of spray into those areas of a building where silver fish are commonly seen. The treatment gives residual protection ordinarily up to one month or more depending upon factors such as cleaning and the like which might remove the residue.

The claims are:
1. A method of destroying insects and preventing insect infestation which comprises applying to a locus to be protected a mixture containing "Sesoxane" and methoxychlor.
2. An insecticidal composition comprising a mixture of "Sesoxane" and methoxychlor.
3. An insecticidal composition comprising an inert carrier, methoxychlor, and "Sesoxane."
4. An insecticidal composition comprising a surface active agent, methoxychlor and "Sesoxane."

References Cited in the file of this patent

Perry et al.: J. Econ. Ent., vol. 44, pp. 839–850 (pp. 845–6 -pert.), December 1951.

King: Chemicals Evaluated as Insecticides and Repellents, Orlando, Fla., U.S. Dept. Agr. Handbook No. 69, May 1954, p. 230.

Chem. and Eng. News, December 1956, p. 6025.

Agr. Chem., February 1957, p. 38.